United States Patent [19]

Denise et al.

[11] Patent Number: 4,593,938

[45] Date of Patent: Jun. 10, 1986

[54] WELDING RING

[75] Inventors: René Denise, Malesherbe; Francis Moreau, Lisses, both of France

[73] Assignee: Societe d'Etude et de Construction de Meteurs d'Aviation S.N.E.C.M.A., Paris, France

[21] Appl. No.: 660,214

[22] Filed: Oct. 12, 1984

[30] Foreign Application Priority Data

Oct. 12, 1983 [FR] France ............... 83 16175

[51] Int. Cl.[4] ............................................. F16L 13/02
[52] U.S. Cl. ............................................. 285/22; 285/24; 285/286; 228/246; 228/250
[58] Field of Search .................. 285/21, 22, 24, 287, 285/286, 189; 228/189, 57, 248, 249, 212, 246, 49.1, 250, 49.3, 56.3

[56] References Cited

U.S. PATENT DOCUMENTS

| Re. 22,725 | 2/1946 | Ahrens ............................. 285/22 |
| 1,872,240 | 8/1932 | Burnish .......................... 285/189 X |
| 3,033,145 | 5/1962 | Thielsch ......................... 285/22 X |
| 3,076,261 | 2/1963 | Christensen .................... 285/22 X |
| 3,210,068 | 10/1965 | Shelton ........................ 285/22 X |
| 4,346,918 | 8/1982 | Lycan ............................... 285/22 |

FOREIGN PATENT DOCUMENTS 1334046 8/1962 France .
2020359 7/1970 France .

Primary Examiner—Dave W. Arola
Attorney, Agent, or Firm—Oblon, Fisher, Spivak, McClelland & Maier

[57] ABSTRACT

A welding ring is made as a flat ring body, of internal diameter equal to the internal diameter of the parts to be assembled and of outer diameter in excess of the external diameter of the parts to be assembled by the mount of a peripheral edge on each face of which are regularly distributed alternately six locating reliefs which are placed in abutment against the outer diameters of the parts to be assembled. A method of welding with such a ring is also described.

4 Claims, 4 Drawing Figures

WELDING RING

BACKGROUND OF THE INVENTION

1. Field of the Invention

This invention relates to welding rings, made of deposition materials, such rings being intended to be interposed between two parts to be assembled, each part being contiguous and having a locally substantially cylindrical contour.

2. Summary of the Prior Art

Welding rings are known, for example from No. FR-A-1 334 046 and No. FR-A-2 020 359. Unfortunately, the rings of these prior proposals are made with a relatively complex shape which necessitates an especial preparation of the parts to be assembled. The cost of such an assembly thus remains relatively high.

One object of the present invention is to provide a welding ring which is extremely simple to manufacture, which does not require any especial preparation of the parts to be assembled, and which enables the achievement of very high precision in the end-to-end abutment of the parts to be assembled.

SUMMARY OF THE INVENTION

According to the present invention there is provided a welding ring of a weld deposition material, comprising a ring body, and a peripheral edge portion integral with the body on each face of which are provided reliefs for locating the ring on end portions of substantially abutting members which are to be welded together, the ring ensuring precise co-axial relationship prior to welding.

Although the shape of the parts to be assembled may be any locally cylindrical form, in general they will have true circular sections, the application envisaged the most frequently being the assembly end-to-end of tubular parts. The object sought and achieved by the invention in the latter case is exact coaxiality of the parts.

One advantage arising from rings in accordance with the invention is that they can be made very simply and at low cost by conventional mechanical operations of stamping and cutting, or pressing and shearing.

A complementary method of welding using rings in accordance with the invention enables exact centering of the parts to be assembled without especial preparation.

DESCRIPTION OF THE PREFERRED EMBODIMENT

Figure 1:
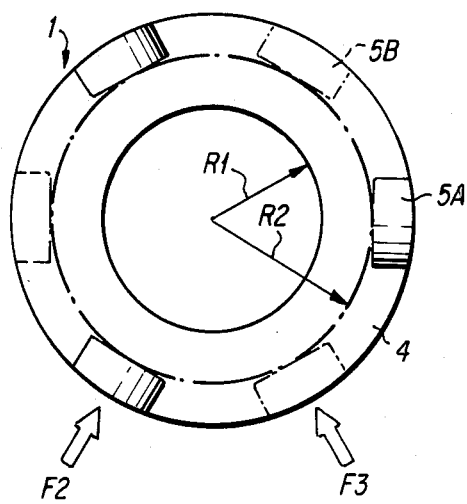
FIG. 1 is a front view of a ring in accordance with the invention.
Figure 2:
FIGS. 2 and 3 are two lateral fragmentary views of reliefs provided in the ring of FIG. 1, viewed in the directions F2 and F3 respectively.
Figure 3:
Figure 4:
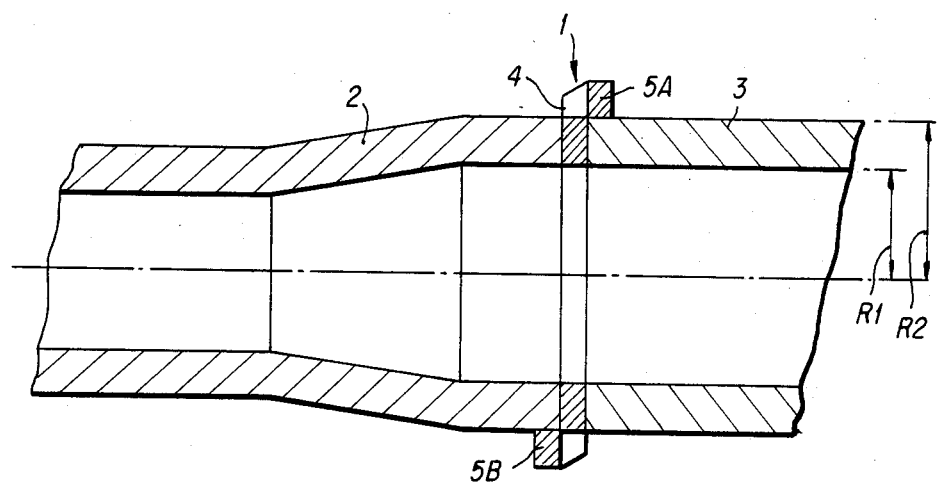
FIG. 4 is a longitudinal section of two tubular parts to be assembled with a ring in accordance with the invention interposed.

The ring 1 made of a convention deposition welding material, is generally flat and, in use, is interposed between the end sections of two parts 2, 3 of tubular form, at least in the zone where the sections are to be assembled.

The ring 1 has an internal diameter equal to the internal diameter $2R_1$ of the parts to be assembled, whilst its outer diameter is in excess of the outer diameter $2R_2$ of the said parts, so as to permit free passage of the peripheral edge portion 4 of which the dimensions are determined by the welding conditions and the thicknesses of the parts.

In this edge, six pips or other reliefs to facilitate centring of the parts are provided by shearing and deformation by pressing circumferentially short marginal strips (5A, 5B) alternately on one and the other side of the ring 1. When the ring is in place, the three reliefs 5A engage the contour of the end portion of the part 3, and the three reliefs 5B that of the part 2 thus ensuring precise coaxiality of the two parts prior to actual welding.

The thickness and the outer diameter of the ring will vary in dependence upon the thickness of the parts to be welded.

It will be readily apparent, that the number of locating reliefs, formed by simple local deformations of the peripheral edge 4, can be varied as a function of the contour. The reliefs are formed by pressing and shearing by means of an appropriate die.

We claim:

1. A welding ring of welded deposition material, comprising:
    a disc-like body having two two axial faces and a radially outer portion integral therewith; and
    a plurality of axially extending reliefs formed only on said radially outer portion, said reliefs each comprising a portion of said disc-like body deformed axially out of the plane of said disc-like body to form localized protrusions, said localized protrusions being continuous and having circumferential ends smoothly merging with said disc-like body, said localized protrusions being formed on both axial faces of said disc-like body, whereby said welding ring may be positioned between substantially abutting members with said protrusions ensuring a precise coaxial relationship of said ring and abutting members by engaging an outer surface of said abutting members.

2. A ring according to claim 1, wherein the body is of circular shape.

3. A ring according to claim 2, wherein the inner diameter of the ring body is equal to that of said abutting parts.

4. A ring according to claim 1 comprising six said protrusions regularly distributed over the peripheral edge portion, alternatively on the one and the other said axial face.

* * * * *